US012591146B2

(12) United States Patent
Kobayashi et al.

(10) Patent No.: US 12,591,146 B2
(45) Date of Patent: Mar. 31, 2026

(54) PROJECTOR AND PROJECTION METHOD FOR FORMING IMAGES ON AERIAL PROJECTION REGION AND REAL PROJECTION SURFACE

(71) Applicant: CASIO COMPUTER CO., LTD., Tokyo (JP)

(72) Inventors: Masaki Kobayashi, Higashiyamato (JP); Kazuyasu Fukano, Hachioji (JP); Tetsuro Narikawa, Hamura (JP); Shunsuke Hara, Fuchu (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 1009 days.

(21) Appl. No.: 17/699,689

(22) Filed: Mar. 21, 2022

(65) Prior Publication Data

US 2022/0299790 A1 Sep. 22, 2022

(30) Foreign Application Priority Data

Mar. 22, 2021 (JP) ................................. 2021-046921

(51) Int. Cl.
*G02B 30/56* (2020.01)

(52) U.S. Cl.
CPC .................................... *G02B 30/56* (2020.01)

(58) Field of Classification Search
CPC ....... G03B 21/26; G02B 30/56; H04N 9/3147
See application file for complete search history.

(56) References Cited

U.S. PATENT DOCUMENTS

| | | | | |
|---|---|---|---|---|
| 2,051,848 | A * | 8/1936 | James ................... | G03B 21/134 359/636 |
| 5,548,348 | A * | 8/1996 | Kawabata ............ | H04N 5/7441 348/766 |
| 6,424,437 | B1 * | 7/2002 | Popovich ............. | H04N 9/3102 353/30 |
| 6,886,943 | B1 * | 5/2005 | Greenberg ............ | G03B 21/26 345/1.3 |
| 7,131,728 | B2 * | 11/2006 | Nambudiri ............. | G02B 27/01 348/E9.026 |
| 7,173,605 | B2 * | 2/2007 | Fong ...................... | G09G 3/002 345/168 |

(Continued)

FOREIGN PATENT DOCUMENTS

| | | |
|---|---|---|
| CN | 112526751 A | 3/2021 |
| JP | 2003-043588 A | 2/2003 |

(Continued)

OTHER PUBLICATIONS

First Office Action dated Apr. 18, 2023 received in Chinese Patent Application No. CN 202210281342.X.

(Continued)

*Primary Examiner* — Bao-Luan Q Le
(74) *Attorney, Agent, or Firm* — Scully, Scott, Murphy & Presser, P.C.

(57) ABSTRACT
A projector includes a projection unit configured to emit projected light, a first projection unit configured to form an image in an aerial projection region from a first part of the projected light, and a second projection unit configured to form an image on a real projection surface from a second part of the projected light, the second part being different from the first part.

11 Claims, 9 Drawing Sheets

(56)  References Cited

U.S. PATENT DOCUMENTS

| | | | | |
|---|---|---|---|---|
| 7,629,877 B2 * | 12/2009 | Lvovskiy | G02B 27/0101 | 340/980 |
| 8,408,720 B2 * | 4/2013 | Nishigaki | H04N 9/3194 | 353/34 |
| 9,686,518 B2 * | 6/2017 | Tsubota | H04N 9/3167 | |
| 10,209,674 B2 | 2/2019 | Suginohara | | |
| 10,409,061 B2 * | 9/2019 | Matsuura | B60K 35/00 | |
| 10,488,657 B2 * | 11/2019 | Sato | G02B 5/0278 | |
| 10,649,208 B2 * | 5/2020 | Li | B60K 35/231 | |
| 11,172,179 B2 * | 11/2021 | Watanabe | G03B 21/28 | |
| 2003/0137641 A1 * | 7/2003 | Yaniv | G03B 21/26 | 353/94 |
| 2005/0057442 A1 * | 3/2005 | Way | H04N 9/3147 | 345/9 |
| 2005/0140929 A1 * | 6/2005 | Nambudiri | G02B 27/01 | 348/E9.026 |
| 2005/0259223 A1 * | 11/2005 | Hopman | G03B 21/28 | 353/13 |
| 2006/0214875 A1 * | 9/2006 | Sonehara | G03B 35/22 | 348/E13.038 |
| 2007/0008503 A1 * | 1/2007 | Choi | G09F 19/18 | 353/98 |
| 2008/0013050 A1 * | 1/2008 | Boute | H04N 7/144 | 348/E7.08 |
| 2009/0268163 A1 * | 10/2009 | Bowden | G01C 21/365 | 345/173 |
| 2010/0253860 A1 * | 10/2010 | Nishigaki | G03B 21/132 | 353/122 |
| 2011/0122049 A1 * | 5/2011 | Lvovskiy | G02B 27/0101 | 345/1.3 |
| 2011/0175798 A1 * | 7/2011 | Sato | B60K 35/00 | 345/7 |
| 2012/0019781 A1 * | 1/2012 | Kuhlman | G02B 27/0101 | 353/89 |
| 2012/0062999 A1 * | 3/2012 | Kuhlman | H04N 13/305 | 359/639 |
| 2012/0170108 A1 * | 7/2012 | Kuhlman | H04N 13/351 | 359/613 |
| 2012/0206697 A1 * | 8/2012 | Lee | G03B 21/28 | 353/82 |
| 2013/0100527 A1 * | 4/2013 | Chung | G03B 21/14 | 359/449 |
| 2014/0118701 A1 * | 5/2014 | Lee | G03B 21/28 | 353/34 |
| 2014/0139928 A1 * | 5/2014 | Piehler | G03B 21/14 | 353/13 |
| 2015/0253572 A1 | 9/2015 | Piehler et al. | | |
| 2015/0268466 A1 * | 9/2015 | Kanamori | B60K 35/00 | 345/8 |
| 2017/0227928 A1 * | 8/2017 | Suginohara | G03H 1/2202 | |
| 2017/0227929 A1 * | 8/2017 | Suginohara | G02B 30/40 | |
| 2017/0235114 A1 * | 8/2017 | Suginohara | G02B 27/10 | 359/631 |
| 2017/0235138 A1 * | 8/2017 | Morohashi | G02B 27/0101 | 359/631 |
| 2020/0192210 A1 * | 6/2020 | Okada | G02B 13/04 | |
| 2021/0157413 A1 * | 5/2021 | Miller | H04N 13/388 | |
| 2022/0307821 A1 * | 9/2022 | Hara | G06F 3/0425 | |
| 2022/0308695 A1 * | 9/2022 | Hara | G06F 3/011 | |
| 2023/0069453 A1 * | 3/2023 | Ogata | G02B 27/145 | |
| 2024/0241390 A1 * | 7/2024 | Ye | G02B 30/20 | |

FOREIGN PATENT DOCUMENTS

| | | |
|---|---|---|
| JP | 2007-272137 A | 10/2007 |
| JP | 2011244044 A | 12/2011 |
| JP | 2014-028593 A | 2/2014 |
| JP | 2017-142279 A | 8/2017 |
| JP | 2019-105744 A | 6/2019 |
| JP | 2019-219560 A | 12/2019 |
| WO | 2009/017134 A1 | 2/2009 |

OTHER PUBLICATIONS

Second Notice of Reason for Refusal dated Jan. 25, 2024 received in Chinese Patent Application No. CN 1 202210281342.X.

Notice of Reasons for Refusal dated Jun. 16, 2022 received in Japanese Patent Application No. JP 2021-046921 together with an English language translation.

* cited by examiner

FIG.9

38
REAR
PROJECTION X2

40

28
SPATIAL
PROJECTION X1

PLEASE INPUT PASSWORD PIN NUMBER.

○○○ _

XXX  BANK 7  8  9

4  5  6

1  2  3

PROJECTOR AND PROJECTION METHOD FOR FORMING IMAGES ON AERIAL PROJECTION REGION AND REAL PROJECTION SURFACE

CROSS-REFERENCE TO RELATED APPLICATION

This patent application is based upon and claims the benefit of priority under 35 USC 119 from Japanese Patent Application No. 2021-046921 filed on Mar. 22, 2021, the entire disclosure of which, including the specification, claims, drawings and abstract, is incorporated herein by reference.

BACKGROUND OF THE INVENTION

Field of the Invention

The present invention relates to a projector and a projection method.

Description of the Related Art

There have conventionally been disclosed aerial display apparatuses for displaying an image in an aerial space where no actual display medium is present. Japanese Patent Laid-Open No. 2019-219560 (JP-A-2019-219560) discloses a display apparatus which includes a display unit configured to display a first image, a mirror device configured to reflect display light of the display unit to form a mid-air or aerial image in a position which is planar symmetric with the display unit, and a display unit disposed between the mirror device and the aerial image and configured not only to transmit the display light which is reflected by the mirror device but also to display a second image. With this display apparatus, the first image, which is the aerial image, is displayed as being superposed on a front side of the second image.

In the conventional display apparatus described above, the first image, which is displayed in the aerial space, passes through the display unit which displays the second image. As a result, when the display light is reflected by the mirror device, about one-half of the display light is lost as lost light, and further, when the first image passes through the display unit, the quality of the first image is deteriorated in terms of brightness, contrast, degree of fineness, and the like. As a result, there may be a case in which the overall quality of the image displayed is also deteriorated.

SUMMARY OF THE INVENTION

According to a first aspect of the present invention, there is provided a projector including a projection unit configured to emit projected light, a first projection unit configured to form an image of a first part of the projected light in an aerial projection region, and a second projection unit configured to form an image of a second part of the projected light, which is different from the first part, on a real projection surface.

According to a second aspect of the present invention, there is provided a projection method including projecting a first part of projected light emitted from a projection unit on an aerial projection region using a first projection unit and projecting a second part of the projected light, which is different from the first part, on a real projection surface using a second projection unit.

BRIEF DESCRIPTION OF THE DRAWINGS

FIG. 9 is a schematic diagram showing an example of a control screen for a cash dispenser to which the projectors according to Embodiments 1 to 5 are applied.

DESCRIPTION OF THE EMBODIMENTS

Embodiment 1

Figure 1:
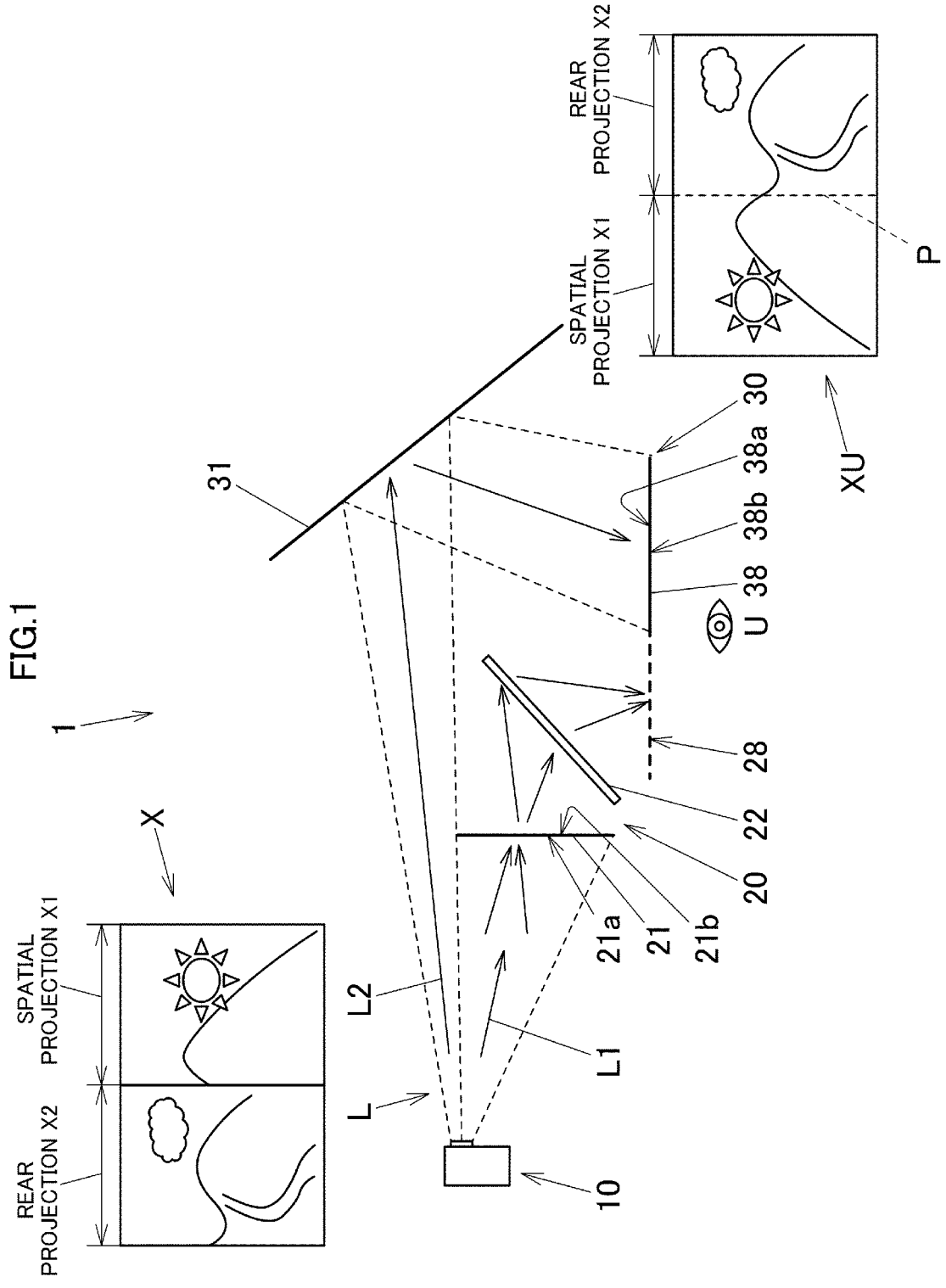
FIG. 1 is a schematic plan view showing a configuration of a projector according to Embodiment 1 of the present invention.
Figure 2:
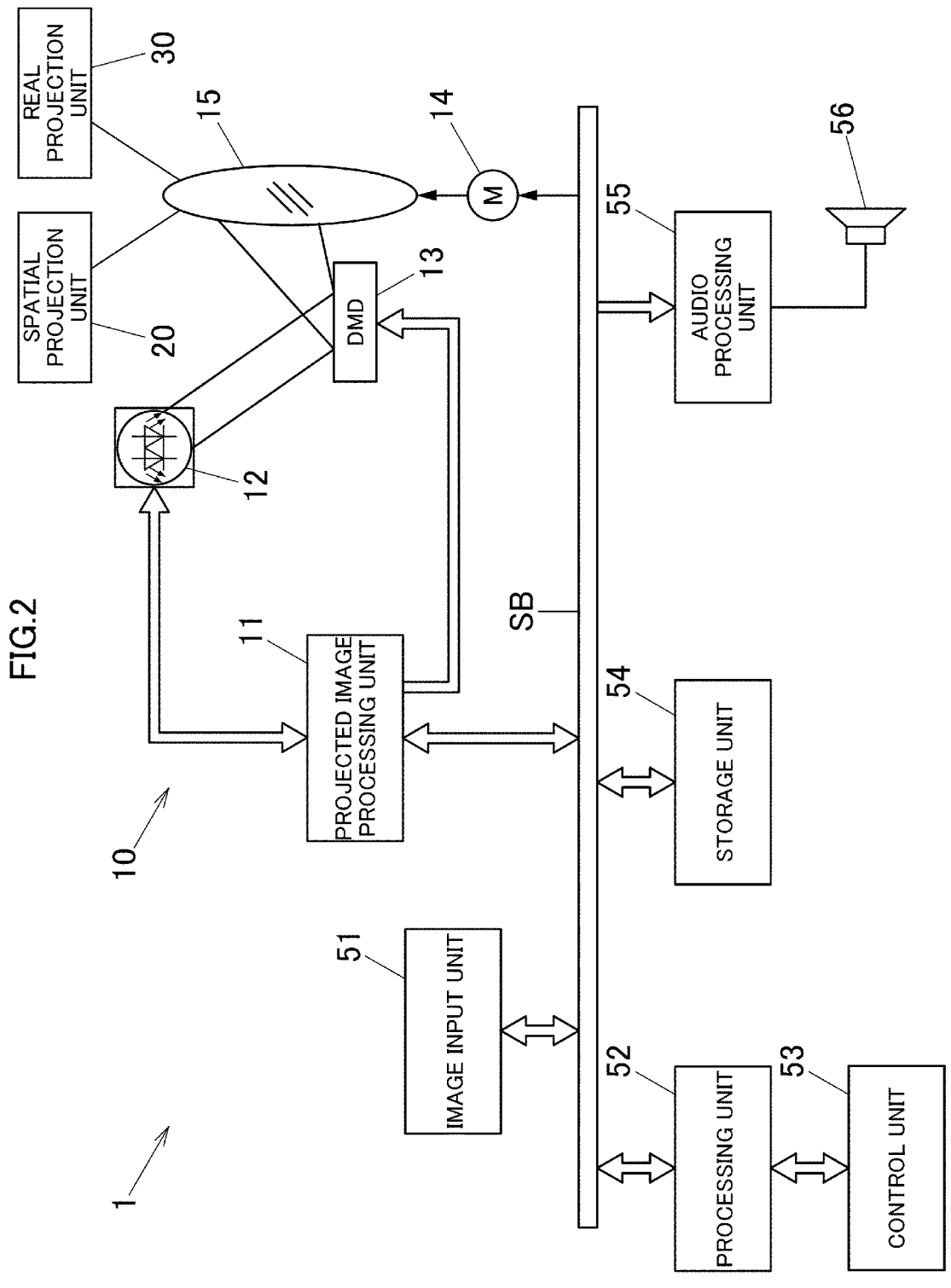
FIG. 2 is a control block diagram of the projector according to Embodiment 1 of the present invention.

Hereinafter, Embodiment 1 of the present invention will be described using FIGS. 1 to 3. FIG. 1 is a schematic plan view showing a projector, which functions as a spatial display apparatus, as viewed from thereabove. FIG. 2 is a control block diagram of the projector 1. The projector 1 has a projection unit 10 configured to emit projected light, a spatial projection unit 20 (first projection unit) configured to form a mid-air image in a mid-air or aerial projection region 28, and a real projection unit 30 (second projection unit) which includes a first transmission-type screen 38, which are all integrated into one unit. The aerial projection region 28 and the first transmission-type screen 38 are disposed in positions which face a user U, so that the user U can view images projected in the aerial projection region 28 and on the first transmission-type screen 38.

As shown in FIG. 2, the projection unit 10 includes a light source apparatus 12. The light source apparatus 12 includes a high-intensity semiconductor light emitting device made up of a laser diode, a light emitting diode, or the like, or a luminescent light emitting device for emitting luminescent light by making use of excitation light and can generate bright light source light. Additionally, the projection unit 10 includes a display device 13. A digital micromirror device (DMD) is used for the display device 13. A high-intensity lamp or the like may be used for the light source apparatus 12, and in place of DMD, a reflection-type or transmission-type liquid crystal display (LCD) may be used for the display device 13.

The projection unit 10 includes a projection optical system 15. The projection optical system 15 can emit image light which is generated at the display device 13 as projected light. The projection optical system 15 includes a fixed lens and a movable lens and can do focusing using a motor 14.

The projector 1 includes an image input unit 51, a processing unit 52, a control unit 53, a storage unit 54, and an audio processing unit 55. The processing unit 52 is configured to govern the control of operations of individual circuitries with the projector 1 and is made up of CPU and control programs which are stored in the storage unit 54. The storage unit 54 is made up, for example, of a solid state driver (SSD) and a static random access memory (SRAM). The control unit 53 includes key switches with which various controls and settings of the projector 1 can be performed and indicators. Control signals of the control unit 53 are transmitted to the processing unit 52.

A projector processor includes CPU including the processing unit 52, a front-end unit including the image input unit 51, and a formatter including a projected image processing unit 11. Image signals of various standards input from the image input unit 51 are transmitted to the processing unit 52 by way of a system bus SB, so that the image signals are transformed so as to be united into an image signal of a predetermined format which is suitable for display at an image transformation module of the processing unit 52, whereafter the image signal so united is output to the projected image processing unit 11. The projected image processing unit 11 drives the display device 13 in response to the output of the united image signal from the image transformation module of the processing unit 52 and controls the light source apparatus 12 so that light in a predetermined wavelength range which is required for image generation is emitted from the light source apparatus 12.

The processing unit 52 is connected with the audio processing unit 55 by way of the system bus SB. The audio processing unit 55 includes a circuitry for a sound source such as a pulse code modulation (PCM) sound source or the like. When the projector 1 is put in a projection mode or a reproduction mode, the audio processing unit 55 converts audio data into analog data and drives a speaker 56 so as to output voice or sound loudly therethrough.

As shown in FIG. 1, a spatial projection unit 20, on which projected light L1 which is a first part of projected light L is incident, has a second transmission-type screen 21 and a spatial projection optical device 22. The second transmission-type screen 21 is a screen in which when projected light L is projected on a front side of the screen, a formed image is displayed on a back side of the screen. In the second transmission-type screen 21, a projection surface 21a is disposed in a position on which the projected light L1, which is the first part of the projected light L projected from the projection unit 10, is incident. The projected light L1 projected on the projection surface 21a is displayed on a display surface 21b which lies on a side of the screen which is opposite to the projection surface 21a and is then emitted as image light.

The spatial projection optical device 22 is disposed on the side of the second transmission-type screen 21 where the display surface 21b is provided. Image light for an image which is to be displayed on the display surface 21b of the second transmission-type screen 21 is incident on the spatial projection optical device 22. The spatial projection optical device 22 has a dihedral corner reflector array (DCRA) and is configured to display a mid-air or aerial image in a position which lies planar symmetric with the display surface 21b on which an image is displayed with respect to the spatial projection optical device 22. In the projector 1, image light for an image which is to be displayed on the display surface 21b of the second transmission-type screen 21 is incident on the spatial projection optical device 22, and the image displayed on the display surface 21b is formed and displayed in the aerial projection region 28 which is disposed in a position which lies planar symmetric with the display surface 21b with respect to the spatial projection optical device 22.

On the other hand, the real projection unit 30, on which projected light L2 of a second part of the projected light L, which differs from the projected light L1 of the first part of the projected light L, is incident, includes a reflection mirror 31 and the first transmission-type screen 38. The reflection mirror 31 is formed as a total reflection mirror. The reflection mirror 31 is disposed at such an angle (in the present embodiment, 45 degrees with respect to an axis of the projected light L) that when the projected light L2 of the second part of the projected light L, which differs from the projected light L1 of the first part of the projected light L, is incident on the reflection mirror 31 from the projection unit 10, an axis of the projected light L2 is changed towards the user U. On the other hand, in the first transmission-type screen 38, which is a transmission-type screen, a projection surface 38a is disposed in a position where the projected light L2 which is reflected on the reflection mirror 31 is shined and projected. In the first transmission-type screen 38, which is made as a projection surface which is not imaginary but real, the image projected on the projection surface 38a is displayed on a display surface 38b which is a surface opposite to the projection surface 38a and is disposed in a position which faces the user U (in other words, the image projected on the projection surface 38a is formed on the real projection surface). Then, the reflection mirror 31 is disposed in such a manner that the aerial projection region 28 and the image display surface 38b of the first transmission-type screen 38 are disposed on substantially the same plane. In other words, the spatial projection unit 20 and the real projection unit 30 are formed so that the spatial projection optical device 22 and the second transmission-type screen 21 of the spatial projection unit 20, and the reflection mirror 31 and the first transmission-type screen 38 of the real projection unit 30 are disposed in such a manner that the aerial projection region 28 and the display surface 38b (the real projection surface) of the first transmission-type screen 38 are disposed on substantially the same plane.

Next, a state in which the projector 1 projects images will be described by taking for example images X, XU shown in FIG. 1. Here, the image X is an image projected by the projected light L emitted from the projection unit 10. The image XU is an image which the user U views. In addition, the image X is an image as viewed from a rear side of a projecting direction. Here, an image shown on a left half portion of the image XU with respect to a vertical center line P (an image of the sun and a part of a mountain) constitutes a spatial projection (image) X1 which is displayed in the aerial projection region 28, and an image shown on a right half portion of the image XU (an image of cloud, a river, and another part of the mountain) constitutes a rear projection (image) X2 which is displayed on the display surface 38b of the first transmission-type screen 38. In this way, the image of the spatial projection X1 and the image of the rear projection X2 are related to each other so that both the images are integrated to make up a whole image.

When the user U can view the image XU, the projection unit 10 is projecting the projected light L1 for the image X. In the image X, the left half portion is made up of the rear projection X2, while the right half portion is made up of the spatial projection X1. Then, the projected light L1 of the first part of the projected light L forms the image of the spatial projection X1, while the projected light L2 of the second part of the projected light L forms the image of the rear projection X2. The image of the spatial projection X1 of the image X which is projected by the projection unit 10 is an image resulting from turning over the image of the spatial projection X1 of the image XU which the user U views around the center line P. This is because the image which is planar symmetric with the image displayed on the display surface 21b of the second transmission-type screen 21 with respect to the spatial projection optical device 22 is displayed in the spatial projection area 28. The image of the rear projection X2 of the image X projected by the projection unit 10 is an image resulting from changing the position of the image of the rear projection X2 of the image XU which the user U views from the right-hand side half portion of the image XU to the left-hand side half portion of the image X. In this way, the projected light L1 (the spatial projection X1) is projected in the aerial projection region 28 by the spatial projection unit 20, and the projected light L2 (the rear projection X2) is projected (displayed) on the display surface 38b of the first transmission-type screen 38 by the real projection unit 30.

Figure 3:
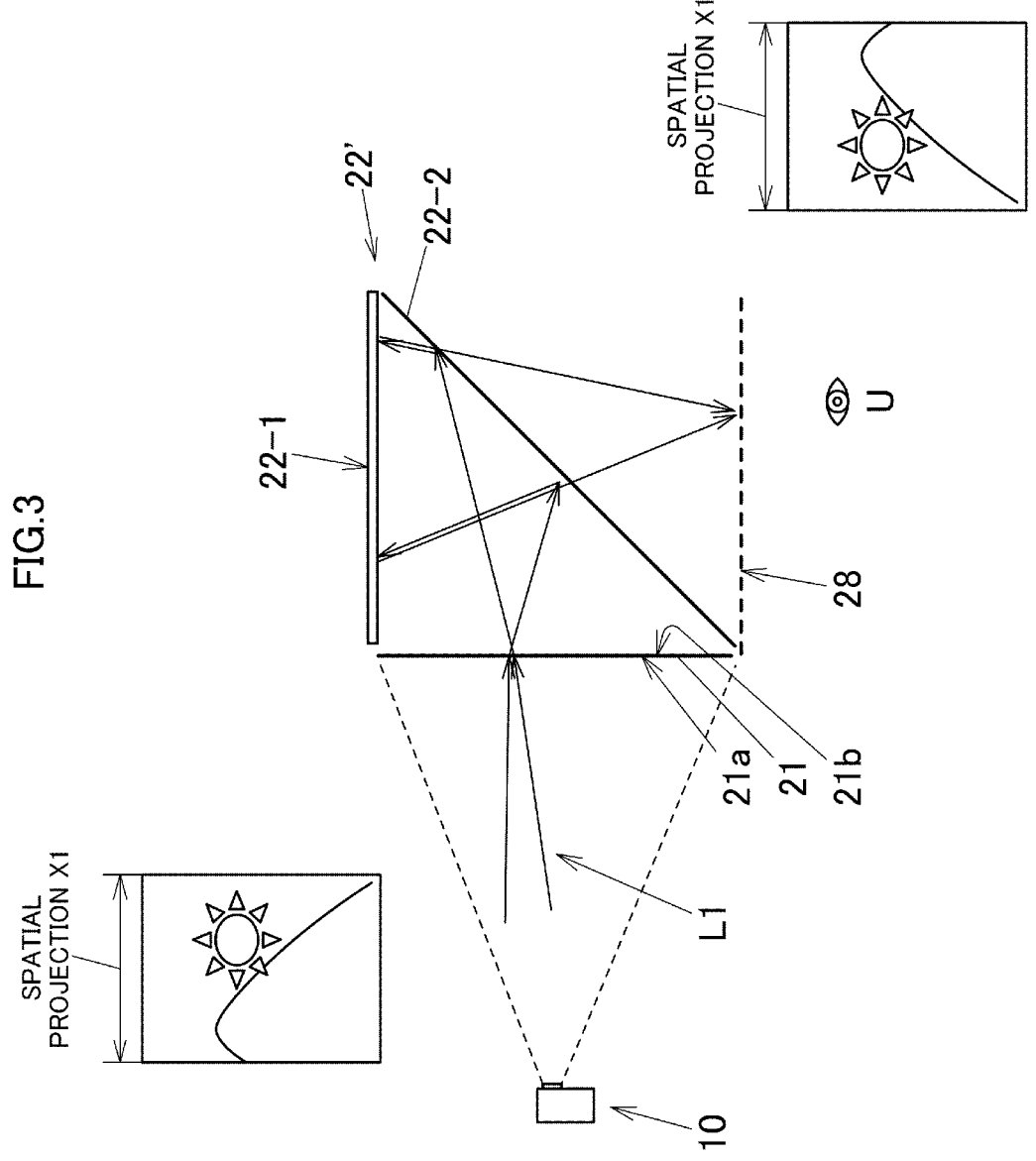
FIG. 3 is a schematic plan view showing an example of a spatial projection optical device of the projector according to Embodiment 1 of the present invention.

Here, a spatial projection optical device 22' shown in FIG. 3 which is made up of a retro-reflection sheet 22-1 and a beam splitter 22-2 can be used for the spatial projection optical device 22. The retro-reflection sheet 22-1 is disposed in a position which faces the aerial projection region 28 (the user U). The beam splitter 22-2 is disposed between the aerial projection region 28 and the retro-reflection sheet 22-1 and at such an angle that incident light, which is the image light from the display surface 21a of the second transmission-type screen 21, is reflected to the retro-reflection sheet 22-1 (45 degrees with respect to the axis of the projected light L). The beam splitter 22-2 is formed as a half mirror which reflects or transmits incident light depending upon an incident angle of the incident light. In this case, image light of the spatial projection X1 displayed on the second transmission-type screen 21 is reflected by the beam splitter 22-2 to be incident on the retro-reflection sheet 22-1, whereby the image light is reflected again by the retro-reflection sheet 22-1. The light reflected by the retro-reflection sheet 22-1 passes through the beam splitter 22-2 and is then focused again to form and display an image in the spatial projection region 28. The spatial projection optical device 22' displays a turned over image of the image displayed on the display surface 21b in the aerial projection region 28 which constitutes a position which is planar symmetric with the display surface 21b of the second transmission-type screen 21 with respect to the beam splitter 22-2.

In the present embodiment, the projector 1 is described as including the projection unit 10, the spatial projection unit 20, and the rear projection unit 30. However, the present invention can also be applied to a projection system in which a projection unit 10, a spatial projection unit 20, and a real projection unit 30 are formed separately. In addition, the projected light L may include further projected light in addition to the projected light L1 and the projected light L2.

Embodiment 2

Figure 4:
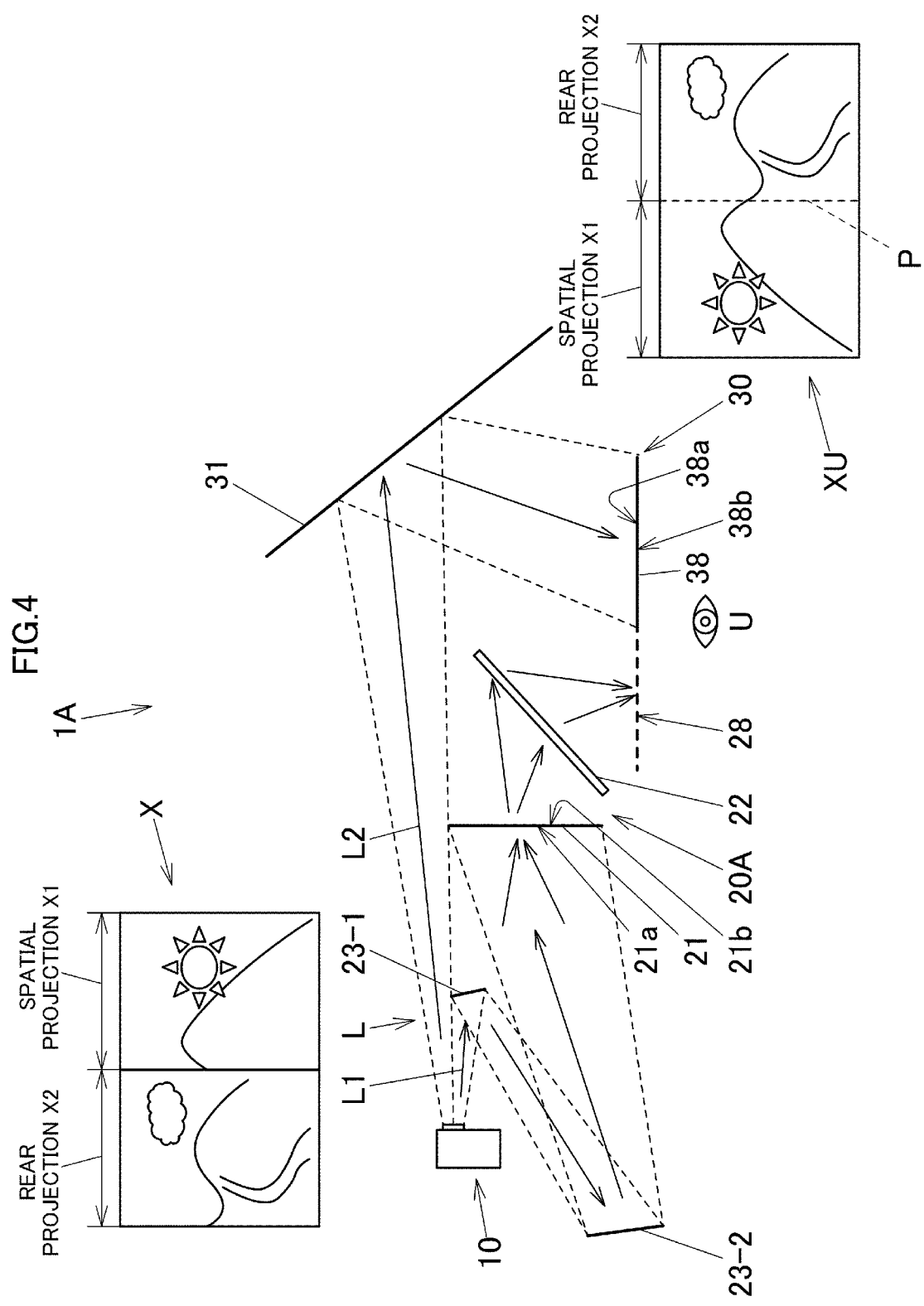
FIG. 4 is a schematic plan view showing a configuration of a projector according to Embodiment 2 of the present invention.

Next, Embodiment 2 of the present invention will be described based on FIG. 4. A projector 1A according to the present embodiment has a spatial projection unit 20A in which a first reflection mirror 23-1 and a second reflection mirror 23-2 are additionally provided in the spatial projection unit 20 of the projector 1 of Embodiment 1. In the following description, the reference numerals given to the configurations or portions of the projector 1 of Embodiment 1 will be given to configurations or portions of the projector 1A which are similar to those of the projector 1, and the description of those similar configurations or portions of the projector 1A will be omitted or simplified.

The first reflection mirror 23-1 of the spatial projection unit 20A is disposed in such a manner that projected light L1 of a first part of projected light L projected from a projection unit 10 is incident thereon so as to be reflected towards the second reflection mirror 23-2 which is disposed closer to the projection unit 10. The second reflection mirror 23-2 is disposed in such a manner that the projected light L1 reflected by the first reflection mirror 23-1 is incident thereon so as to be reflected towards a second transmission-type screen 21. The projected light L1 reflected by the second reflection mirror 23-2 is projected on the second transmission-type screen 21, whereby an image is displayed on a display surface 21b of the second transmission-type screen 21.

Image light of the image which is displayed on the display surface 21b of the second transmission-type screen 21 is incident on a spatial projection optical device 22. In this way, the image displayed on the display surface 21b of the second transmission-type screen 21 is formed and displayed as a mid-air or aerial image in a mid-air or aerial region 28 which is disposed in a position which is planar symmetric with the display surface 21b with respect to the spatial projection optical device 22. The configuration of a real projection unit 30 is the same as that of the real projection unit 30 of Embodiment 1. In addition, an image X which is projected by the projection unit 10 and an image XU which a user U views are the same as those of Embodiment 1.

With the projector 1A according to the present embodiment, a spatial projection X1 and a rear projection X2 can be focused. That is, the spatial projection X1 and the rear projection X2 can be focused by making a focal length of the projected light L1 from the projection unit 10 to the aerial projection region 28 equal to a focal length of projected light L2 from the projection unit 10 to a first transmission-type screen 38. In the case that the aerial projection region 28 and the first transmission-type screen 38 are arranged differently from the projector 1A, a different configuration can be adopted as a configuration in which a focal length from the projection unit 10 to the aerial projection region 28 is made equal to a focal length from the projection unit 10 to the first transmission-type screen 38. For example, a reflection mirror is disposed between the first transmission-type screen 38 and a reflection mirror 31 of the real projection unit 30 or between the reflection mirror 31 and the projection unit 10 so as to adjust a focal length between the first transmission-type screen 38 and the reflection mirror 31 or between the projection unit 10 and the reflection mirror 31, whereby the spatial reflection X1 and the rear projection X2 can also be focused.

Embodiment 3

Next, Embodiment 3 of the present invention will be described based on FIG. 5. A projector 1B according to the present embodiment includes a spatial projection unit 20B in which a reflection screen 24, whose projection surface is made up of a display surface 24*a*, is used for the second transmission-type screen 21 in the spatial projection unit 20 of the projector 1 described in Embodiment 1. In the following description, the reference numerals given to the configurations or portions of Embodiments 1, 2 will be given to configurations or portions of Embodiment 3 which are similar to those of Embodiments 1, 2, and the description of those similar configurations or portions of Embodiment 3 will be omitted or simplified.

The reflection screen 24 is such that projected light L1 of a first part of projected light L projected from a projection unit 10 is projected on a display surface 24*a* whereby an image is displayed thereon and image light of the image displayed on the display surface 24*a* is incident on a spatial projection optical device 22. A mid-air or aerial projection region 28 is disposed in a position which is planar symmetric with the display surface 24*a* of the reflection screen 24 with respect to the spatial optical device 22

In a real projection unit 30B, a first transmission-type screen 38 is disposed on an axis of projected light L2 of a second part of the projected light L projected from the projection unit 10 so that the projected light L2 is projected on the first transmission-type screen 38. As a result, the projected light L2 of the second part of the projected light L from the projection unit 10 is directly incident on a projection surface 38*a* of the first transmission-type screen 38, whereby an image is displayed on a display surface 38*b* of the first transmission-type screen 38 which the user U can view.

Figure 5:
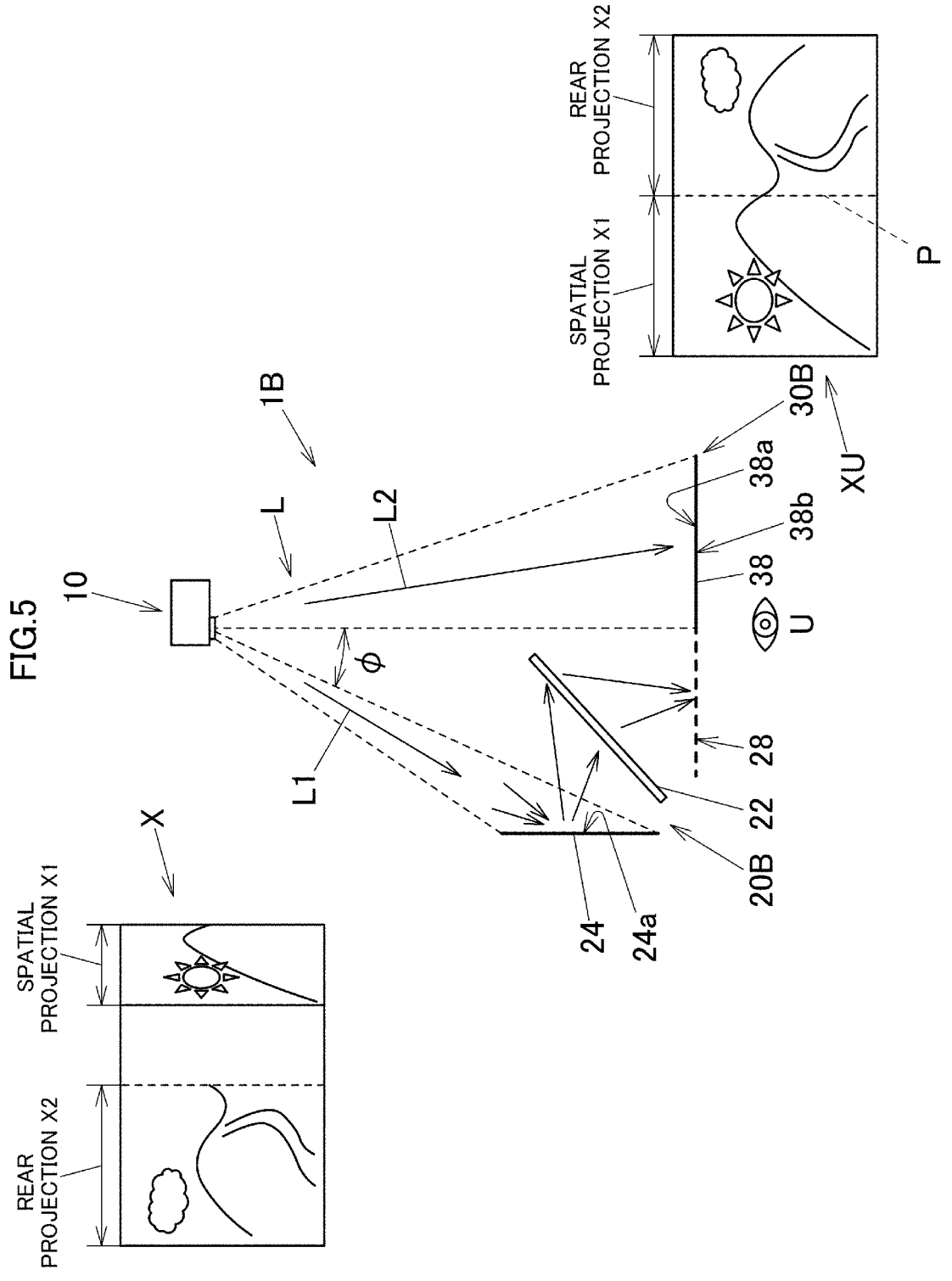
FIG. 5 is a schematic plan view showing a configuration of a projector according to Embodiment 3 of the present invention.

With the projector 1B, too, the user U can view an image XU which is similar to those in Embodiments 1, 2, that is, an image XU shown in FIG. 5. As this occurs, the projection unit 10 is projecting an image X shown in FIG. 5. In the image X, an image of a spatial projection X1 is compressed in a left-right direction. This is because since the reflection screen 24 and the aerial projection region 28 are disposed planar symmetric with each other with respect to the spatial projection optical device 22, a region in the projected light L1 where the spatial projection optical device 22 is disposed (a region defined by an angle Φ) constitutes a region where an image cannot be projected. As a result, the image of the spatial projection X1 of the image X becomes more compressed in the left-right direction than an image of a spatial projection X1 of an image XU which the user U views. On the other hand, since an image of a rear projection X2 of the image X is projected directly on a first transmission-type screen 38, the image is formed as an image which results from turning over an image of a rear projection X2 of the image XU which the user U views around a center line P.

With the projector 1B, the spatial projection unit 20B can easily focus on the aerial projection region 28 by adjusting the position of the reflection screen 24. In addition, the real projection unit 30B, which projects image light, that is, an image directly on the first transmission-type screen 38, can also easily focus on the display surface 38*b*. As a result, the projector 1B can be provided which facilitates the adjustment of the focal length with a reduced number of reflection mirrors The filing date of the Japanese Patent Application: Mar. 22, 2021 when compared with Embodiment 2. In the present embodiment, too, the spatial projection optical device 22 is disposed and the spatial projection unit 20B and the real projection unit 30B are formed in such a manner that the aerial projection region 28 and the display surface 38*b* (the real projection surface) of the first transmission-type screen 38 lie substantially on the same plane.

Embodiment 4

Next, Embodiment 4 of the present invention will be described based on FIG. 6. A projector 1C according to the present embodiment includes a spatial projection unit 20C which has a second transmission-type screen 21, which is the same as the second transmission-type screen 21 of the spatial projection unit 20 of Embodiment 1, and a spatial projection microlens array 25 in place of the reflection screen 24 and the spatial projection optical device 22 of the spatial projection unit 20B of the projector 1B described in Embodiment 3. In the following description, the reference numerals given to the configurations or portions of Embodiments 1 to 3 will be given to configurations or portions of Embodiment 4 which are similar to those of Embodiments 1 to 3, and the description of those similar configurations or portions of Embodiment 4 will be omitted or simplified.

The spatial projection unit 20C of the projector 1C includes the second transmission-type screen 21 and the spatial projection microlens array 25. Projected light L1 of a first part of projected light L is incident and projected on a projection surface 21*a* of the second transmission-type screen 21, and an image is displayed on a display surface 21*b* of the second transmission-type screen 21. The spatial projection microlens array 25 emits image light, which is incident thereon from an incident side 25*a*, from an emerging side 25*b* and causes the image light to focus in an aerial projection region 28 to form an image for display therein. A distance from the spatial projection microlens array 25 to the aerial projection region 28 is equal to a distance from the spatial projection microlens array 25 to the display surface 21*b* of the second transmission-type screen 21. The spatial projection microlens array 25 is formed by, for example, joining two lens elements, which make up the microlens array, closely and tightly while disposing the lens elements in such a manner that optical axes thereof coincide with each other.

A real projection unit 30C of the projector 1C is the same as the real projection unit 30B of the projector 1B in Embodiment 3. Projected light L2 of a second part of projected light L from a projection unit 10 is incident directly on a projection surface 38*a* of a first transmission-type screen 38, whereby an image is displayed on a display surface 38*b* of the first transmission-type screen 38.

Figure 6:
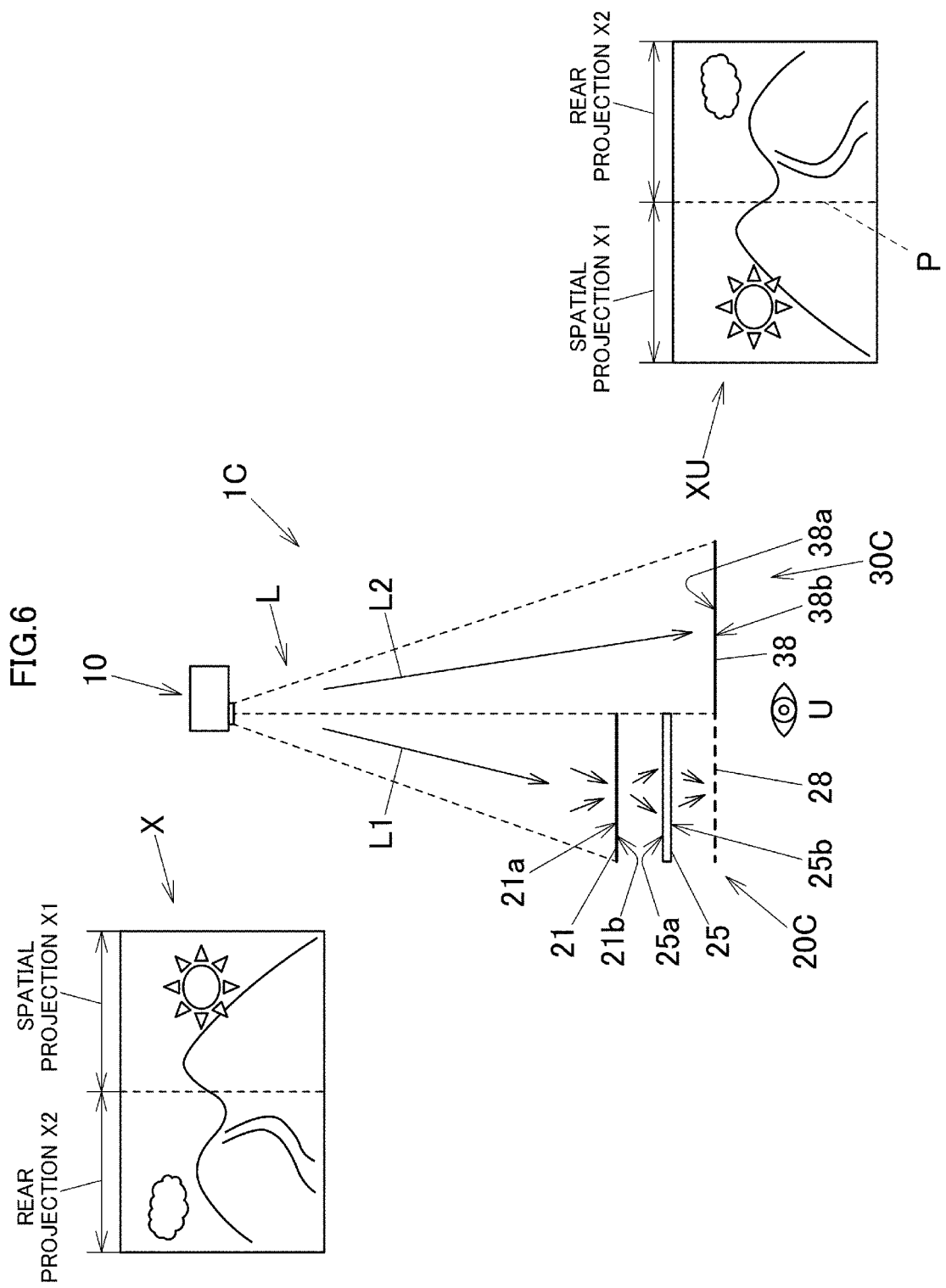
FIG. 6 is a schematic plan view showing a configuration of a projector according to Embodiment 4 of the present invention.

In the projector 1C, too, as with Embodiments 1 to 3, the user U can view an image XU shown in FIG. 6. As this occurs, the projection unit 10 is projecting an image X shown in FIG. 6. This image X is an image resulting from turning over the image XU.

In this way, the projector 1C using the spatial projection microlens array 25 can be configured relatively simple. As a result, images which are projected individually on the aerial projection region 28 and the first transmission-type screen 38 can easily be focused thereat. In the present embodiment, too, the microlens array 25 is disposed and the spatial projection unit 20C and the real projection unit 30C are formed in such a manner that the aerial projection region 28 and the display surface 38*b* (the real projection surface) of the first transmission-type screen 38 lie substantially on the same plane.

Embodiment 5

Figure 7:
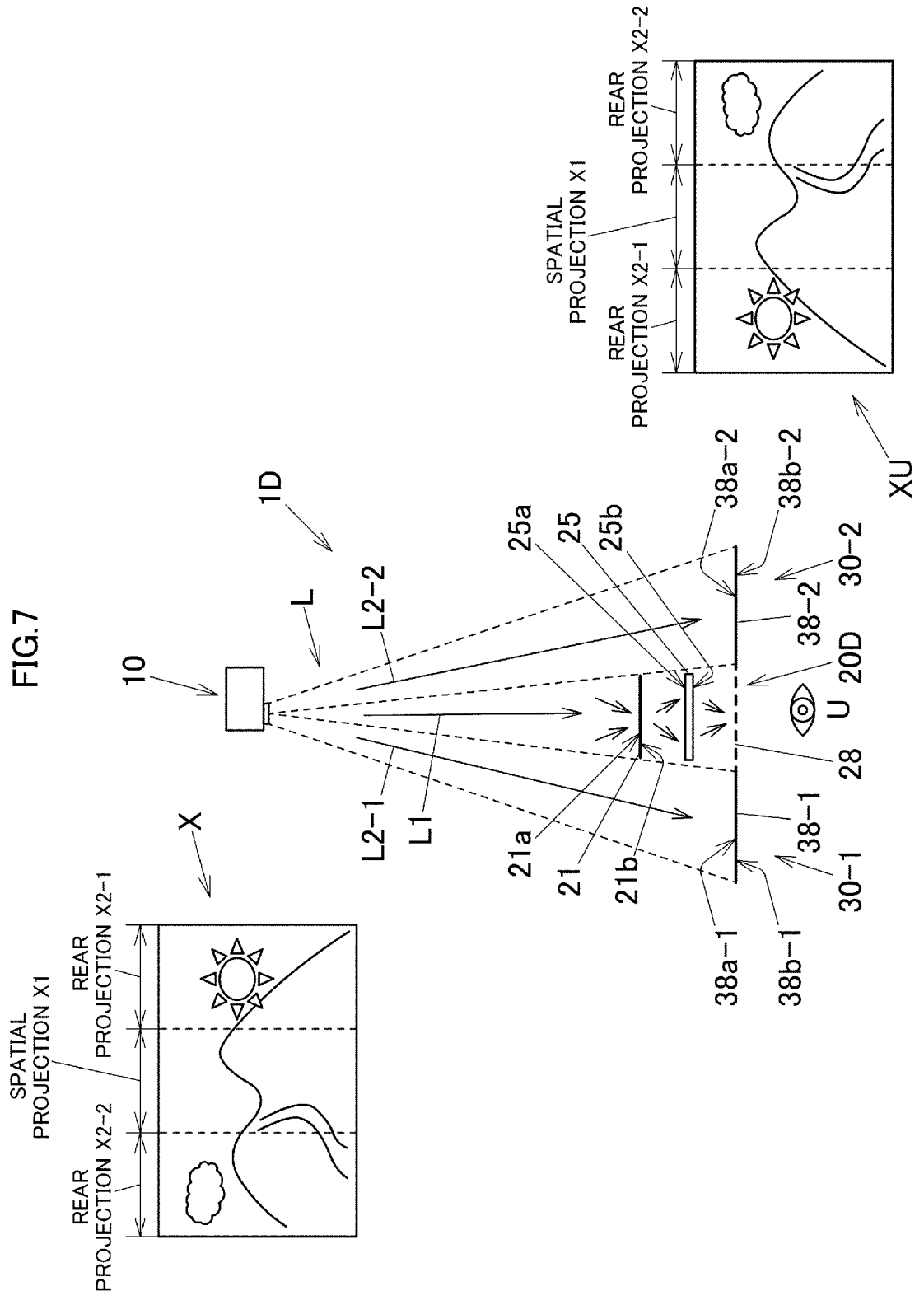
FIG. 7 is a schematic plan view showing a configuration of a projector according to Embodiment 5 of the present invention.

Next, Embodiment 5 of the present invention will be described based on FIG. 7. A projector 1D according to the present embodiment is such that the arrangement of the spatial projection unit 20C and the real projection unit 30C of the projector 1C described in Embodiment 4 is changed. Specifically speaking, a spatial projection unit 20D, which is similar to the spatial projection unit 20C of Embodiment 4, is disposed at a center, and real projection units 30-1, 30-2 are disposed at the left and right of the spatial projection unit 20D, respectively. In the following description, the reference numerals given to the configurations or portions of Embodiments 1 to 4 will be given to configurations or portions of Embodiment 5 which are similar to those of Embodiments 1 to 4, and the description of those similar configurations or portions of Embodiment 5 will be omitted or simplified.

In the projector 1D, first transmission-type screens 38-1, 38-2 are provided spaced apart from each other in a left-right direction as viewed by the user U (in other words, the first transmission-type screens 38-1, 38-2 are provided on a circumference of the aerial projection region 28). The aerial projection region 28 is provided between the first transmission-type screens 38-1, 38-2. An image which the user U views is an image XU shown in FIG. 7, which is similar to the images XU in Embodiments 1 to 4. The image X shown in FIG. 7 which is formed by projected light L projected from a projection unit 10 is an image resulting from turning over the image XU. An image of a spatial projection X1 corresponds to projected light L1 of a first part of the projected light L from the projection unit 10. An image of a rear projection X2-1 corresponds to projected light L2-1 of a second part of the projected light L, and an image of a rear projection X2-2 corresponds to projected light L2-2 of the second part of the projected light L. The projected light L1 is disposed at a center of the projected light L, and as viewed from a projecting direction, the projected light L2-1 is disposed at a right-side portion and the projected light L2-2 is disposed at a left-side portion of the projected light L.

In the present embodiment, too, the spatial projection unit 20D and the real projection unit 30D can easily focus on the aerial projection region 28 and the first transmission-type screen 38, respectively, by disposing the aerial projection region 28 and the display surfaces 38b-1, 38b-2 on substantially the same plane. The present embodiment is such that the arrangement of the aerial projection region 28 (the spatial projection X1) and the display surface 38b (the rear projection X2) of the first transmission-type screen 38 on the same plane in Embodiment 4 is changed. Similarly, the arrangement of the aerial projection region 28 (the spatial projection X1) and the first transmission-type screen 38 (the rear projection X2) on the same plane can also be changed in the projectors 1, 1A, 1B of Embodiments 1 to 3, too.

Figure 8A:
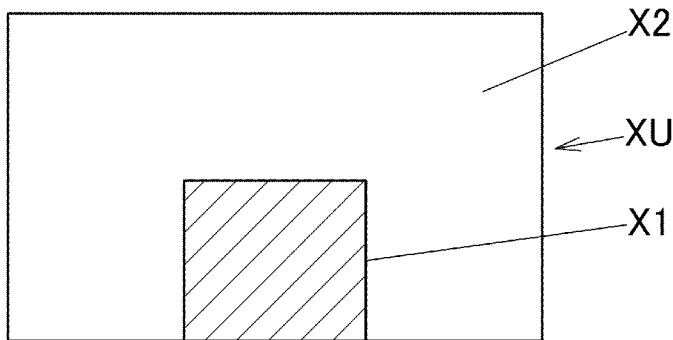
FIG. 8A is a schematic diagram showing Modified Example 1 of an arrangement of a spatial projection X1 and a rear projection X2 in an image that a user views through the projectors according to Embodiments 1 to 5 of the present invention.
Figure 8B:
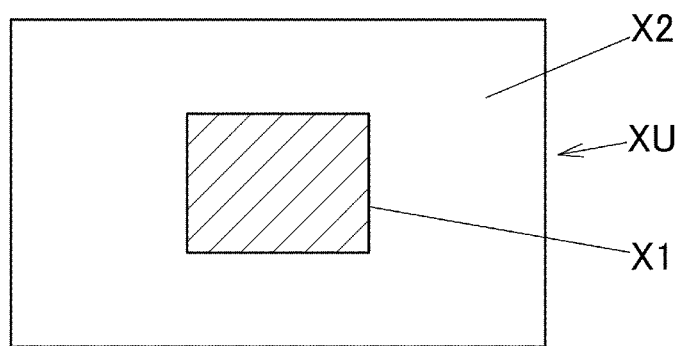
FIG. 8B is a schematic diagram showing Modified Example 2 of an arrangement of the spatial projection X1 and the rear projection X2 in the image that the user views through the projectors according to Embodiments 1 to 5 of the present invention.
Figure 8C:
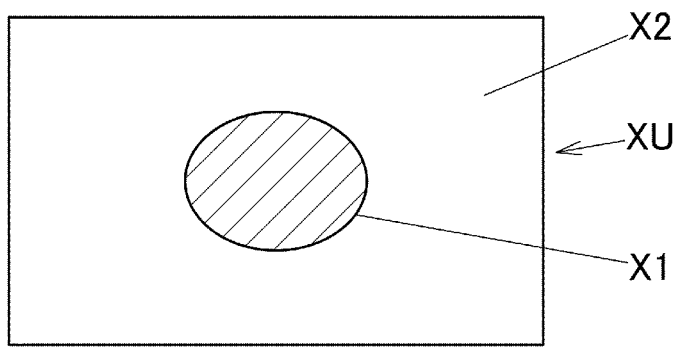
FIG. 8C is a schematic diagram showing Modified Example 3 of an arrangement of the spatial projection X1 and the rear projection X2 in the image that the user views through the projectors according to Embodiments 1 to 5 of the present invention.

FIGS. 8A to 8C show examples (Modified Examples 1 to 3) of arrangements of the spatial projection X1 and the rear projection X2 of the image XU which the user U views. In FIG. 8A (Modified Example 1), a rectangular spatial projection X1, which is shown as being hatched, is disposed at a central lower portion, and a substantially U-shaped rear projection X2 is disposed on a circumference of the spatial projection X1 with an open side being directed downwards. The aerial projection region 28 where the image of the spatial projection X1 is displayed is not real but imaginary, and hence, a first transmission-type screen 38 matching the shape of the image of the rear projection X2 need only be formed. Hereinafter, similarly, in FIG. 8B (Modified Example 2), a rectangular spatial projection X1 is disposed at a center, and an angular ring-shaped rear projection X2 is disposed around a circumference of the rectangular spatial projection X1. In FIG. 8C (Modified Example 3), an elliptic spatial projection X1 is disposed at a center, and an angular ring-shaped rear projection X2 is disposed around a circumference of the elliptic spatial projection X1.

Figure 9:
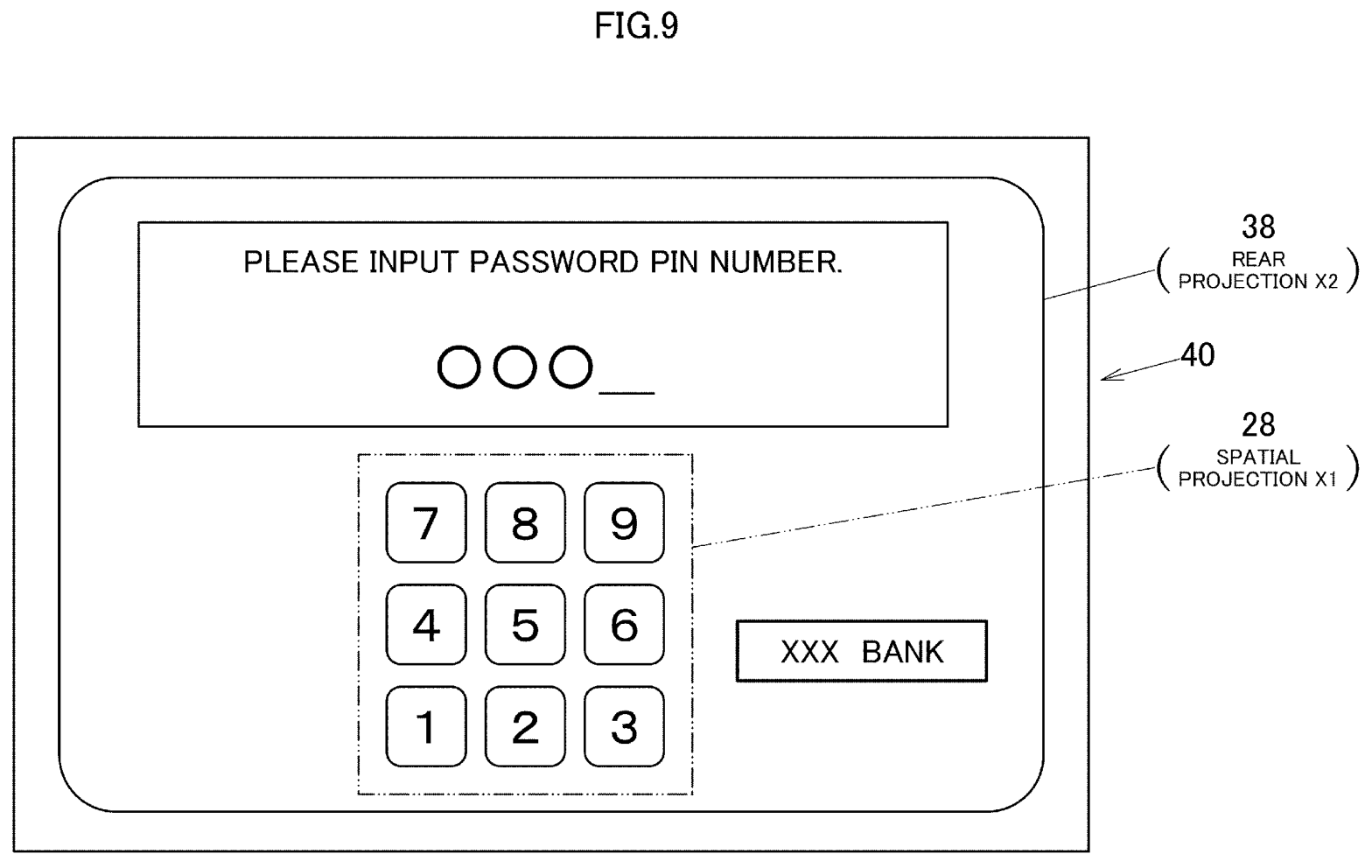

FIG. 9 shows an application example of the present invention, that is, a control screen for a bank cash dispenser. A control screen 40 shown in FIG. 9 is a non-contact panel, and a ten-keys section (a control section) for inputting password PIN number is formed of a spatial projection X1 (an aerial projection region 28). When any one of ten keys of the ten-keys section is depressed, the depression of the relevant key is detected in a non-contact fashion by a separate sensor or the like. Then, the other portion than the spatial projection X1 (the aerial projection region 28) of the control screen 40 is formed of a rear projection X2 (a first transmission-type screen 38). A display range of the rear projection X2 is a portion which does not have to be touched by a user.

In this way, a non-contact panel is formed in which a portion like a control screen of equipment which needs to be touched by a user is displayed through the aerial projection region 28 to thereby reduce a risk of infections through a virus that would otherwise be caused by many people touching the portion, whereas an image displayed using a transmission-type screen which can produce an image of a high image quality (brightness, degree of fineness, or the like) can be used for an image of the remaining portion which does not have to be touched by the user.

Thus, with the embodiments of the present invention, the projector 1 includes the projection unit 10 for emitting the projected light L (L1, L2), the spatial projection unit 20, 20A to 20D for forming an image in the aerial projection region 28 from the projected light L1 of the first part of the projected light L, and the real projection unit 30, 30B, 30C, 30-1, 30-2 for forming an image on the display surface 38b, 38b-1, 38b-2, which is the real projection surface, of the first transmission-type screen 38, 38-1, 38-2 from the projected light L2 of the second part, which differs from the first part, of the projected light L.

As a result, the image formed from the bright and clear projected light from the projection unit 10 is displayed on the first transmission-type screen 38, 38-1, 38-2 which is the transmission-type screen including the real projection surface together with the mid-air or aerial projected image displayed in the aerial projection region 28. This can provide the projector 1 in which the portion where the spatial projection is preferable and the real image display surface are provided together so as to improve the overall image quality of the displayed images.

The focal length from the projection unit 10 to the aerial projection region 28 can be made equal to the focal length from the projection unit 10 to the first transmission-type screen 38, 38-1, 38-2. As a result, the mid-air or aerial image projected in the aerial projection region 28 and the image projected on the first transmission screen 38, 38-1, 38-2 can both be formed as well-focused clear images.

The spatial projection unit 20 has the second transmission-type screen 21 on which the projected light L1 is projected from the projection unit 10 and the spatial projection optical device 22, 22' on which the image light for the image which is displayed on the display surface 21b of the second transmission-type screen 21 is incident. The real projection unit 30 has the reflection mirror 31 for reflecting the projected light L2 from the projection unit 10 and the first transmission-type screen 38 on which the projected light from the reflection mirror 31 is projected. As a result, the projection unit 10, and the aerial projection region 28 and the first transmission-type screen 38 can be disposed to be directed so that the axis of the projected light L from the projection unit 10 becomes right angles to the aerial projection region 28 and the display surface 38b of the first transmission-type screen 38 which the user U views, whereby the maximum length of the projector 1 (the projection system) can be shortened.

In the spatial projection unit 20, the multiple reflection mirrors (the first reflection mirror 23-1, the second reflection mirror 23-2) for reflecting the projected light L1 can be provided between the projection unit 10 and the second transmission-type screen 21. As a result, the image which is the mid-air or aerial image displayed in the aerial projection region 28 and the image displayed on the first transmission-type screen 38 can be focused properly thereat, whereby the clear images can be projected.

The reflection mirror 31 is disposed in such a manner that the aerial projection region 28 and the display surface 38b of the first transmission-type screen 38 are disposed on the same plane. As a result, the projector 1, 1A can project the displayed images without causing the user U to feel a sensation of spatial distance between the image displayed in the aerial projection region 28 and the image displayed on the display surface 38b of the first transmission-type screen 38 when the user U views them, whereby the user U can be prevented from feeling a sensation of physical disorder then.

The spatial projection unit 20B has the reflection screen 24 on which the projected light L1 is projected from the projection unit 10 and the spatial projection optical device 22, 22' on which the image light for the image which is displayed on the display surface 24a of the reflection screen 24 is incident. The real projection unit 30B has the first transmission-type screen 38 which is disposed on the axis of the projected light L2 so that the projected light L2 is projected thereon. As a result, the reflection screen 24 is used to project the image of the spatial projection X1 on the aerial projection region 28, while the image of the rear projection X2 can be projected directly on the display surface 38b of the first transmission-type screen 38, whereby the bright images can be displayed by reducing the loss of the projected light.

The spatial projection optical device 22 is disposed in such a manner that the aerial projection region 28 and the display surface 38b of the first transmission-type screen 38 are disposed on the same plane. As a result, the projector 1B can project the display images without causing the user U to feel a sensation of spatial distance between the image displayed in the aerial projection region 28 and the image displayed on the display surface 38b of the first transmission-type screen 38 when the user U views them, whereby the user U can be prevented from feeling a sensation of physical disorder then.

The spatial projection unit 20C has the second transmission-type screen 21 on which the projected light L1 is projected from the projection unit 10 and the spatial projection microlens array 25 on which the image light of the image which is displayed on the display surface 21b of the second transmission-type screen 21 is incident. The real projection unit 30C has the first transmission-type screen which is disposed on the axis of the projected light L2 so that the projected light L2 is projected thereon. As a result, the projector 1 can be provided which can easily focus the image which is projected on the aerial projection region 28 and the image which is displayed on the display surface 38b of the first transmission-type screen 38 with the simple configuration.

The spatial projection microlens array 25 is disposed in such a manner that the aerial projection region 28 and the display surface 38b of the first transmission-type screen 38 are disposed on the same plane. As a result, the projector 1C can project the display images without causing the user U to feel a sensation of spatial distance between the image displayed in the aerial projection region 28 and the image displayed on the display surface 38b of the first transmission-type screen 38 when the user U views them, whereby the user U can be prevented from feeling a sensation of physical disorder then.

The aerial projection region 28 is provided between the first transmission-type screens 38-1, 38-2 which are provided spaced apart from each other. Alternatively, the first transmission-type screen 38 can also be provided on the circumference of the aerial projection region 28. As a result, the images can simultaneously be displayed on the first transmission-type screen 38 which can be configured variously so as to match the application and the aerial projection region 28 which is displayed in the aerial space.

The aerial projection region 28 can be formed into the control section. As a result, the non-contact type control panel can be formed.

A projection method of the projector 1 includes projecting the projected light L1 of the first part of the projected light L emitted from the projection unit 10 on the aerial projection region 28 using the spatial projection unit 20, 20A to 20D and projecting the projected light L2 of the second part, which differs from the first part, of the projected light L on the first transmission-type screen 38 including the real projection surface using the real projection unit 30, 30B, 30C, 30-1, 30-2. As a result, the clear image formed through the real projection by the first transmission-type screen 38 of the real projection unit 30, 30B, 30C, 30-1, 30-2 and the image formed in the aerial projection region 28 through the spatial projection by the spatial projection unit 20, 20A to 20D can be displayed together to thereby improve the overall image quality of the displayed images.

The embodiments that have been described heretofore are presented as examples, and hence, there is no intention to limit the scope of the present invention by those embodiments. These novel embodiments can be carried out in other various forms, and various omissions, replacements, and modifications can be made thereto without departing from the spirit and scope the invention. These embodiments and their variations are included in the spirit and scope of the invention and are also included in scopes of inventions set forth under claims and their equivalents.

What is claimed is:

1. A projector comprising:

a projection unit configured to emit projected light;

a first projection unit configured to form an image of a first part of the projected light in an aerial projection region; and a second projection unit configured to form an image of a second part of the projected light, which is different from the first part, on a real projection surface, wherein the real projection surface of the second projection unit comprises a display surface of a first transmission-type screen, wherein the first projection unit comprises a second transmission-type screen on which the projected light from the projection unit is projected and a spatial projection microlens array on which image light for an image which is displayed on a display surface of the second transmission-type screen is incident, and wherein the second projection unit comprises the first transmission-type screen which is disposed on an axis of projected light of the second part of the projected light so that the projected light of the second part is projected on the first transmission-type screen.

2. The projector according to claim 1, wherein an optical path length from the projection unit to the aerial projection region is substantially equal to an optical path length from the projection unit to the real projection surface.

3. The projector according to claim 1, wherein the first projection unit comprises multiple reflection mirrors configured to reflect the projected light, the multiple reflection mirrors being provided between the projection unit and the second transmission-type screen.

4. The projector according to claim 1, wherein the spatial projection microlens array is disposed in such a manner that the aerial projection region and the display surface of the first transmission-type screen lie on an identical plane.

5. The projector according to claim 1, wherein the first transmission-type screen is one first transmission-type screen, wherein the second projection unit further comprises another first transmission-type screen which is disposed on another axis of another projected light of the second part of the projected light so that the another projected light of the second part is projected on the another first transmission-type screen, and wherein the aerial projection region is provided between the one first transmission-type screen and the another first transmission-type screen which are provided spaced apart from each other.

6. The projector according to claim 1, wherein the real projection surface is provided on a circumference of the aerial projection region.

7. The projector according to claim 1, wherein the aerial projection region makes up a control unit configured to receive a control operation by a user.

8. A projection method comprising:

projecting a first part of projected light emitted from a projection unit on an aerial projection region using a first projection unit; and projecting a second part of the projected light, which is different from the first part, on a real projection surface using a second projection unit, wherein the real projection surface of the second projection unit comprises a display surface of a first transmission-type screen, wherein the first projection unit comprises a second transmission-type screen on which the projected light from the projection unit is projected and a spatial projection microlens array on which image light for an image which is displayed on a display surface of the second transmission-type screen is incident, and wherein the second projection unit comprises the first transmission-type screen which is disposed on an axis of projected light of the second part of the projected light so that the projected light of the second part is projected on the first transmission-type screen.

9. The projection method according to claim 8, wherein an optical path length from the projection unit to the aerial projection region is substantially equal to an optical path length from the projection unit to the real projection surface.

10. The projection method according to claim 8, wherein the first projection unit comprises multiple reflection mirrors configured to reflect the projected light, the multiple reflection mirrors being provided between the projection unit and the second transmission-type screen.

11. The projection method according to claim 8, wherein the spatial projection microlens array is disposed in such a manner that the aerial projection region and the display surface of the first transmission-type screen lie on an identical plane.

* * * * *